US008468256B1

(12) United States Patent
McArdle et al.

(10) Patent No.: US 8,468,256 B1
(45) Date of Patent: *Jun. 18, 2013

(54) AUTOMATICALLY CONFIGURING A COMPUTER FIREWALL BASED ON NETWORK CONNECTION

(75) Inventors: Mark J. McArdle, Conestogo (CA); Brent A. Johnston, Kitchener (CA); Philip D. R. Nathan, Kitchener (CA); James Dool, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 11/772,759

(22) Filed: Jul. 2, 2007

Related U.S. Application Data

(62) Division of application No. 09/803,527, filed on Mar. 8, 2001, now Pat. No. 7,284,267.

(51) Int. Cl.
*G06F 7/00* (2006.01)
(52) U.S. Cl.
USPC ............................ 709/228; 707/791; 707/793
(58) Field of Classification Search
None
See application file for complete search history.

(56) References Cited

U.S. PATENT DOCUMENTS

| | | | | |
|---|---|---|---|---|
| 5,070,528 A * | 12/1991 | Hawe et al. | ................... | 713/161 |
| 5,150,464 A * | 9/1992 | Sidhu et al. | ................... | 709/222 |
| 5,204,961 A * | 4/1993 | Barlow | .............................. | 726/1 |
| 5,388,213 A * | 2/1995 | Oppenheimer et al. | ....... | 709/245 |
| 5,751,572 A * | 5/1998 | Maciulewicz | .................... | 700/3 |
| 5,845,087 A * | 12/1998 | Trehus | .......................... | 709/242 |
| 5,968,176 A * | 10/1999 | Nessett et al. | ................... | 726/11 |
| 5,983,350 A | 11/1999 | Minear et al. | | |
| 5,987,610 A | 11/1999 | Franczek et al. | | |
| 6,055,236 A * | 4/2000 | Nessett et al. | ................ | 370/389 |
| 6,073,142 A | 6/2000 | Geiger et al. | | |
| 6,098,172 A | 8/2000 | Coss et al. | | |
| 6,154,775 A | 11/2000 | Coss et al. | | |
| 6,167,445 A | 12/2000 | Gai et al. | | |
| 6,304,973 B1 * | 10/2001 | Williams | .......................... | 726/3 |
| 6,330,562 B1 | 12/2001 | Boden et al. | | |
| 6,366,912 B1 * | 4/2002 | Wallent et al. | ......................... | 1/1 |
| 6,415,313 B1 * | 7/2002 | Yamada et al. | ............... | 709/200 |
| 6,460,050 B1 | 10/2002 | Pace et al. | | |
| 6,466,976 B1 | 10/2002 | Alles et al. | | |
| 6,484,261 B1 * | 11/2002 | Wiegel | ............................ | 726/11 |
| 6,560,630 B1 * | 5/2003 | Vepa et al. | ..................... | 718/105 |
| 6,772,348 B1 * | 8/2004 | Ye | .................................... | 726/13 |
| 6,788,681 B1 * | 9/2004 | Hurren et al. | ................. | 370/389 |
| 7,016,980 B1 * | 3/2006 | Mayer et al. | .................. | 709/249 |
| 7,062,550 B1 * | 6/2006 | Hutchinson et al. | .......... | 709/224 |
| 7,193,968 B1 * | 3/2007 | Kapoor et al. | ................ | 370/235 |
| 7,506,155 B1 | 3/2009 | Stewart et al. | | |
| 2002/0002678 A1 * | 1/2002 | Chow et al. | ................... | 713/169 |

OTHER PUBLICATIONS

Cheng, P.C. et al, "A Seurity Architecture for the Internet Protocol," 1998, IBM, vol. 37, No. 1, pp. 42-60.*

(Continued)

*Primary Examiner* — Azizul Choudhury
(74) *Attorney, Agent, or Firm* — Patent Capital Group

(57) ABSTRACT

A method, system, and policy file data structure stored on computer-readable medium comprise reading a policy identifier field containing data representing an identifier for a security policy. Further, a protocol identifier field is read containing data representing an identifier for a protocol associated with the security policy identified in the policy identifier field. In addition, a protocol element entry containing data representing a protocol element for protocol identified by the protocol identifier field is associated with a network adapter.

12 Claims, 6 Drawing Sheets

OTHER PUBLICATIONS

Duan Haixin, Wu Jianping, Li Xing. Policy-based Access Control Framework for Large Networks. Networks, 2000. (ICON 2000). Proceedings. IEEE International Conference on, vol., Iss., 2000. pp. 267-272.

J.D. Guttman. Filtering Postures: Local Enforcement for Global Policies. Security and Privacy, 1997. Proceedings, 1997 IEEE Symposium on May 4-7, 1997. pp. 120-129.

Yair Bartal, Alain Mayer, Kobbi Nissim, Avishai Wool. Firmato: a Novel Firewall Management Toolkit. Security and Privacy. Proceedings of the 1999 IEEE Symposium on May 9-12, 1999. pp. 17-31.

Vipul Gupta, Gabriel Montengro. Secure and Mobile Networking. Mobile Networks and Applications, 1998. Special Issue: Mobile Networking on the Internet. vol. 3, Iss. 4, 1998. pp. 381-390.

* cited by examiner

AUTOMATICALLY CONFIGURING A COMPUTER FIREWALL BASED ON NETWORK CONNECTION This is a Divisional application of prior application Ser. No. 09/803,527 filed on Mar. 8, 2001 now U.S. Pat. No. 7,284,267, the disclosure of which is incorporated herein by reference.

FIELD OF THE INVENTION

This invention relates generally to firewalls for networked computers, and more particularly to automatically configuring a firewall for a networked computer.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Network Associates, Inc., All Rights Reserved.

BACKGROUND OF THE INVENTION

When a computer is connected to a public network, such as the Internet, the computer is vulnerable to attack and compromise from other computers on the network. In contrast, if the same computer is connected to a private network, such as a corporate local area network (LAN), the security risks are much fewer, and features like file and printer sharing are common. Therefore, firewall software has been developed to protect the computer and such software is configurable by the user to determine the level of security desired.

In many cases, the computer may be connected to different networks at different times. For example, a notebook computer that is connected to a corporate LAN when the user is in the office may be connected to a public network when the user is working at home or traveling. The security configuration for the computer when it is used in the office would allow most all network traffic to and from the LAN because the LAN is a trusted network. On the other hand, when the computer is connected to a public network, the security configuration should be changed to prevent almost all unsolicited traffic because the public network is untrusted.

Using prior art firewall software, the user must manually re-configure the security settings when changing network connections, posing significant risks and challenges in protecting the computer. If the user attempts to connect to a trusted network with the firewall configured for an untrusted network, the user probably cannot log into the corporate LAN because it is likely that some of the protocols allowed on the LAN are prohibited on the untrusted network. More critically, if the firewall software is configured for a trusted network when the user connects the computer notebook to an untrusted network, the computer is now much less protected from attack.

SUMMARY OF THE INVENTION

A firewall protecting a computer is automatically configured to a particular security policy based on an address assigned to a network adapter. A zone that contains the network address is determined and a security policy that is assigned to the zone is associated with the network adapter. The security policy specifies the configuration the firewall uses when handling network traffic between the adapter and the network corresponding to the address. In another aspect, the address assigned to the network adapter is also determined.

Because higher levels of protection can be specified in security policies for zones that encompass untrusted networks, the computer is protected from attacks from an untrusted network when it switches from a trusted one. Since the firewall is configured automatically, the computer is not blocked from accessing the trusted network when it switches back. Furthermore, the user no longer has to remember how the firewall was last configured and then manually change the security settings if necessary. Thus, the risks of switching connections from a trusted to an untrusted network are reduced and the complexities of firewall management are hidden from the user.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

Figure 1A:
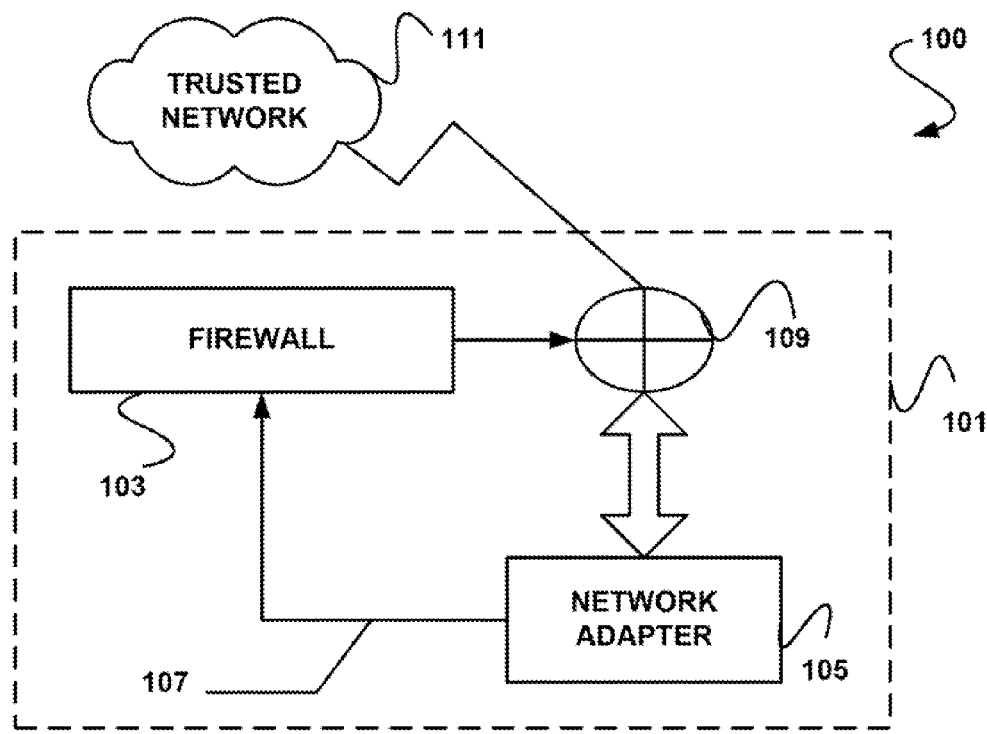
FIGS. 1A and 1B are diagrams illustrating a system-level overview of an embodiment of the invention.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIGS. 1A and 1B, which illustrate a networked client computer 101 that connects to two different networks through a network adapter 105. One is a trusted network 111, such as a privately controlled corporate local-area network (LAN). The other is an untrusted network 113, such as the Internet, that exposes the computer 101 to security attacks.

Firewall software 103 in the computer 101 filters all network traffic passing between the computer 101 and a network in accordance with a security policy. When the network adapter 105 connects to a network, the firewall software 103 queries the network adapter 105 for the network address of the computer. If the network adapter 105 responds with an address within a zone of addresses for the trusted network 111 (as illustrated by arrow 107 in FIG. 1A), the firewall automatically configures itself according to a security policy 109 designed for a trusted network 111. On the other hand, if the address returned is within the zone of addresses for the untrusted network 113 (as illustrated by arrow 115 in FIG. 1B), the firewall automatically configures itself in accordance with a security policy 117 assigned to the untrusted network 113. Thus, the computer 101 is protected from attacks from the untrusted network 113 without the user having to manually reconfigure the firewall software 103 when switching connections from a trusted to an untrusted network.

Figure 1B:
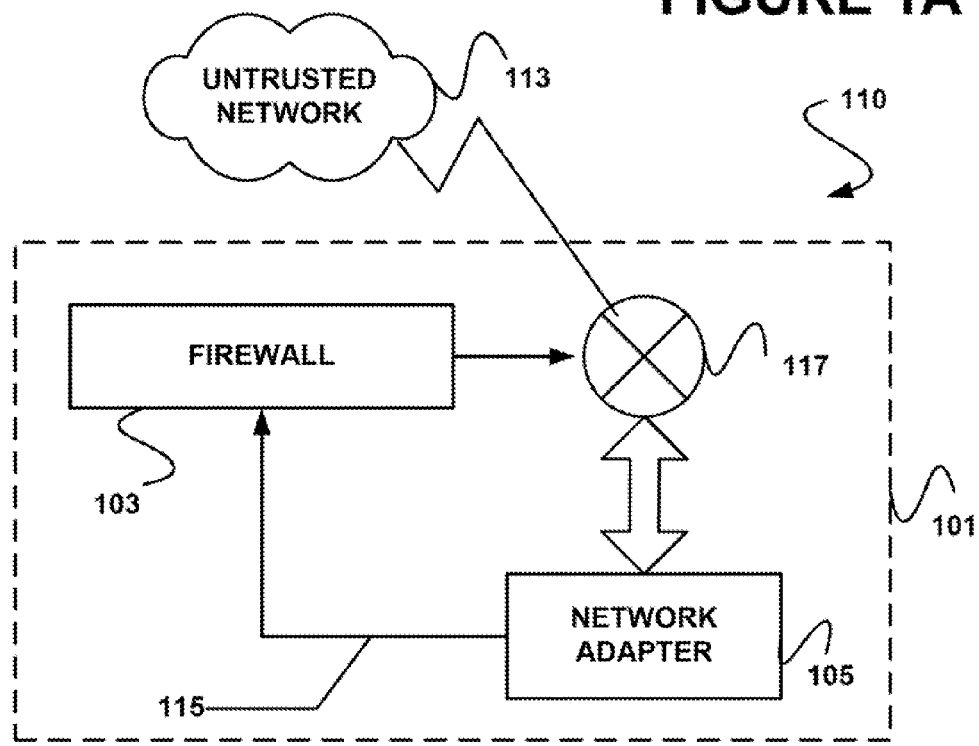

Although only two networks are illustrated in FIGS. 1A and 1B, a mixture of multiple trusted networks, multiple trusted, and/or untrusted security policies are contemplated and within the scope of the invention. Furthermore, a computer may have more than one network adapter installed and the invention handles each one independently so that traffic addressed to each network adapter is filtered according to the security policy assigned to the particular adapter. It will be appreciated that the invention does not depend on the manner in which the network address is assigned to the adapter and is applicable to both static and dynamic assigned addresses.

Figure 2A:
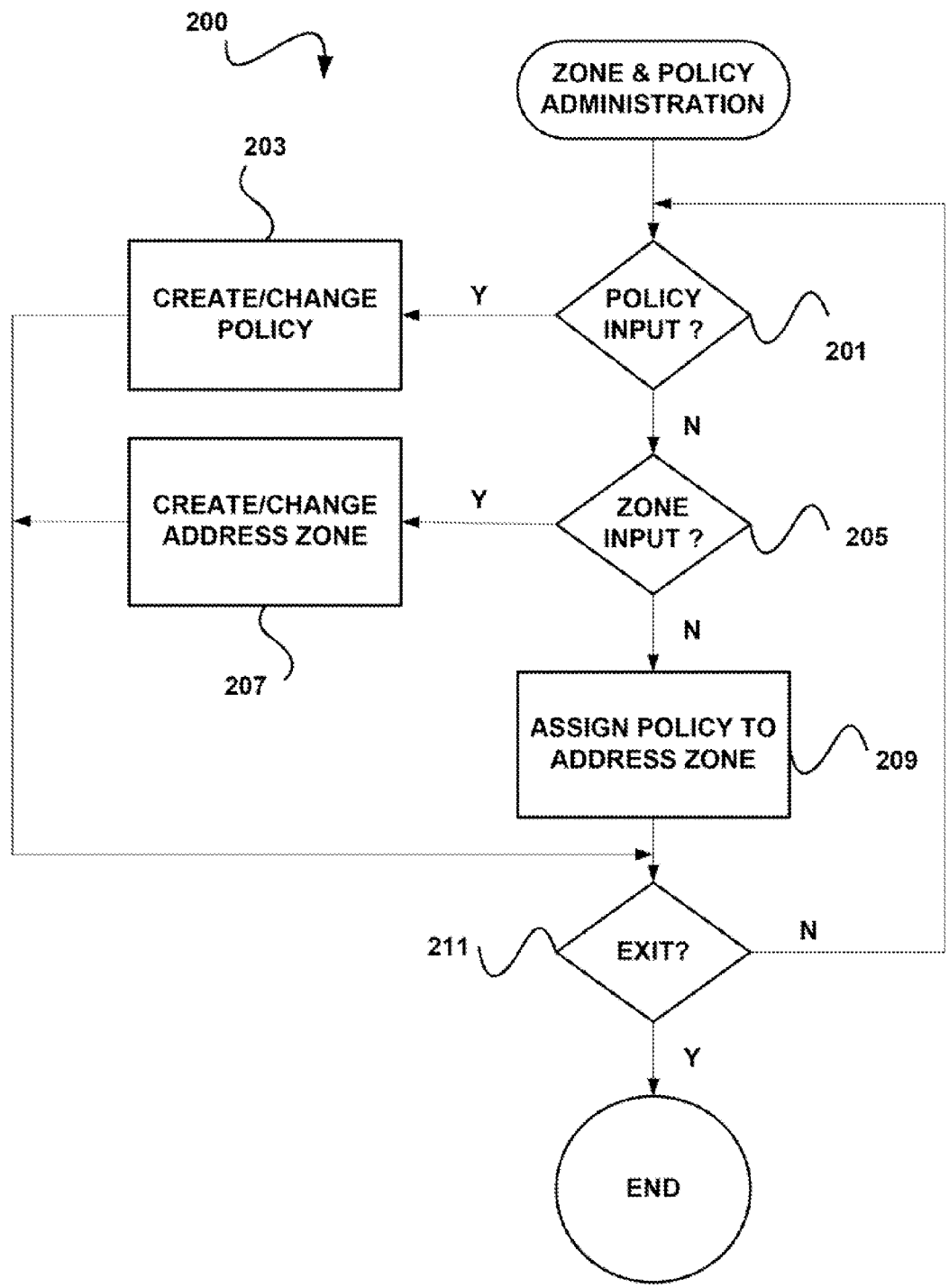
FIGS. 2A and 2B are flowcharts of methods to be performed by a client computer according to an embodiment of the invention.
Figure 2B:
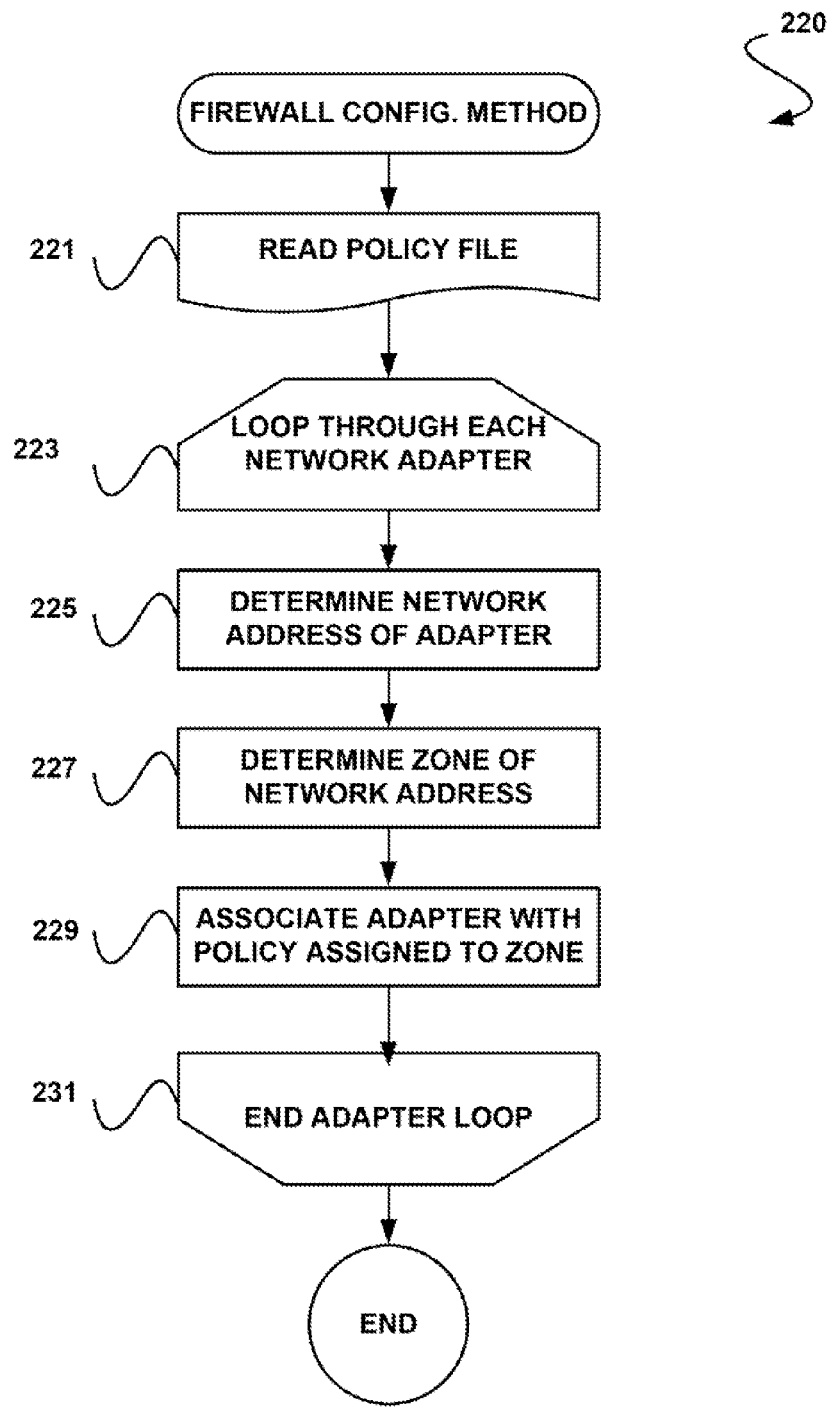

Next, methods to be performed by the user, or client, computer in accordance with one embodiment of the invention are described in terms of computer software with reference to flowcharts shown in FIGS. 2A and 2B. The methods constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will be further appreciated that the acts described in conjunction with FIGS. 2A and 2B are not required to be performed in the particular order shown and that the processes of the invention may be divided into more or fewer logical blocks than those shown.

The address zones for the networks may be defined by a systems administrator or by the user. An address zone can be defined positively or negatively. In one embodiment, an address zone is bounded through a range of addresses (or a network subnet). In another embodiment, an address zone is defined by a list of addresses. In an embodiment for TCP/IP and similar networks, all addresses within specified subnet having an address greater than or equal to a defined starting address are considered within a particular zone. Alternatively, the address zone for a network may be defined negatively by listing excluded addresses, with all other addresses being considered within the zone. A zone does not have to be explicitly defined since all addresses not within a defined zone are considered to be within a default zone. In one embodiment, initially all network addresses are considered within a default zone and are considered part of an untrusted network.

Similarly, the security policies may be based on a default configuration or tailored to the requirements of the systems administrator or the user. One embodiment of a zone and policy administration method 200, illustrated in FIG. 2A, is invoked by the systems administrator or the user to create or change policies, zones, and the assignment of policies to zones. If input to the administration method 200 is policy information (block 201), the method 200 creates or changes the appropriate policy (block 203). If the input is zone information (block 205), the method 200 creates or changes the appropriate network zone (block 207). Otherwise, the input is assignment information, which causes a selected policy to be assigned to a selected zone (block 209). If there is no further processing to be performed (block 211), the method 200 ends.

In an alternate embodiment not shown, the policies, zones, and assignments can be "locked down" so that only authorized users can change them. In still another embodiment, the administration method 200 runs on a server computer and the system administrator defines the policies, zones, and assignments, which are subsequently transparently downloaded to the client computer as part of a standard automated update routine performed when the client is connected to a particular network location.

A firewall configuration method 220 illustrated in FIG. 2B is invoked to determine what security policy to apply to network traffic through the network adapters installed in the client computer. The method 220 reads a policy file containing the policies, zones, and assignments at block 201. An exemplary embodiment of a policy file is described further below. The method 220 loops through all the network adapters on the computer (block 223 through block 231), determining the network address of each (block 225) and the zone to which the network address belongs (block 227). The method 220 associates the adapter with the security policy assigned to the zone (block 229).

Once the appropriate security policy has been associated with a network adapter, the firewall filters incoming and outgoing network traffic as specified by the security policy. One of skill the art will immediately recognize that the method 220 may be invoked at various times, such as when the computer is booted, when a network connection is initially made, when the policy settings are updated, and/or when a network connection changes.

The processing represented block 225 depends on the operating system executing on the computer. For example, in a computer executing Microsoft Windows NT or Windows 2000, the network adapters installed on the computer and their current network addresses are stored in an operating system registry. Thus, in one embodiment for Windows NT/2000, the method 200 maps each adapter registry identifier to its network address in another section of the registry. The Windows 95 and Windows 98 registries do not have similar entries for installed network adapters. Therefore, in one Windows 9x embodiment, the processing at block 225 monitors network traffic and examines the initial network traffic for each adapter to determine the network address. Embodiments for other operating systems may invoke standard system calls at block 225 to determine the network address. In an alternate embodiment of method 220 not shown, the adapter device drivers would modified to invoke and send a network addresses to the method 220 when the corresponding adapter connects to a network.

Figure 3:
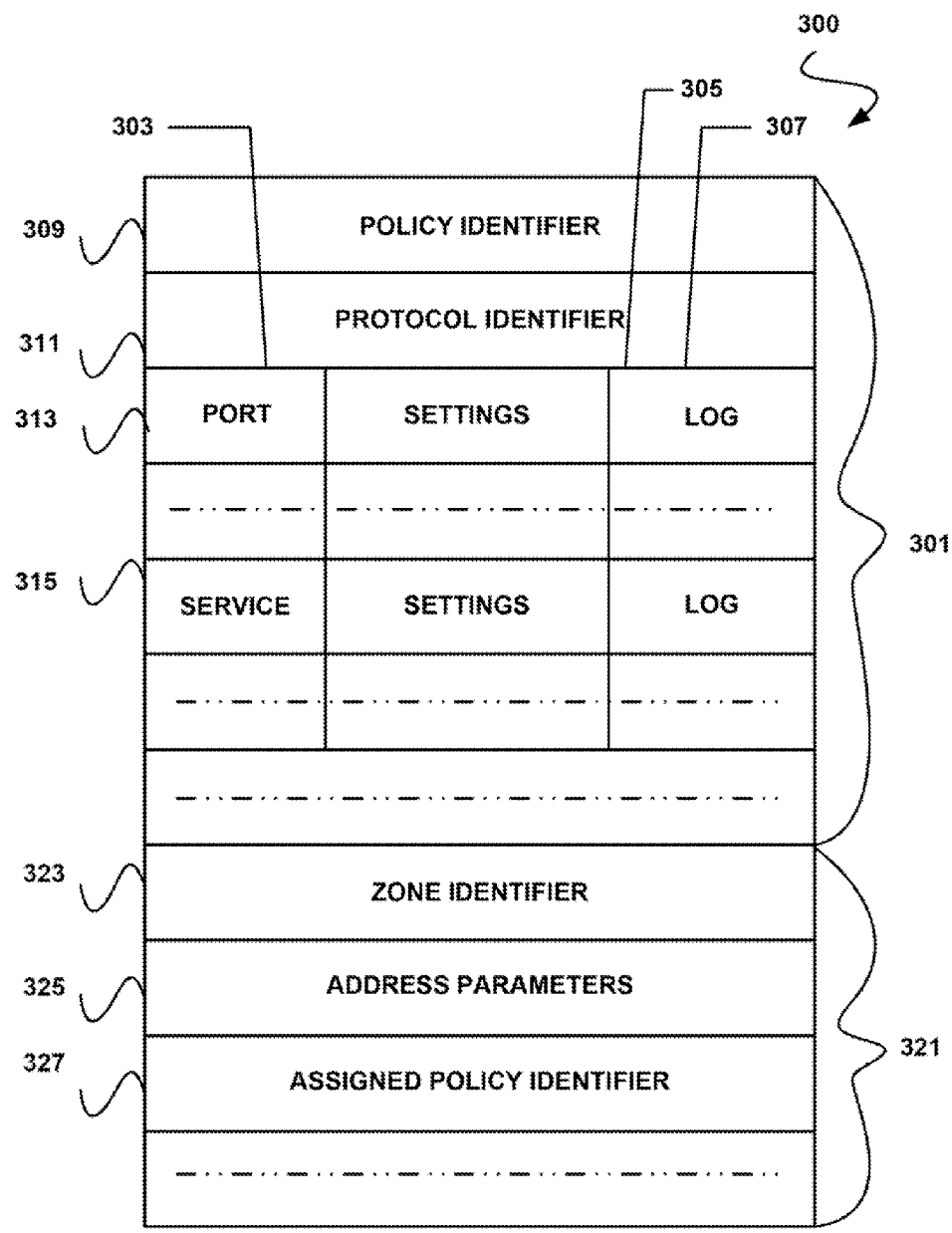
FIG. 3 is a diagram of a policy data structure for use in an implementation of the invention.

Turning now to FIG. 3, one embodiment of a policy file data structure 300 is described that contains the information for policies, zones, and assignments. In one particular embodiment, the policy file data structure 300 is stored as an XML (extensible markup language) document in the file system of the client computer although the invention is not so limited.

A security policy section 301 of the policy file data structure 300 contains an entry for each security policy. A security policy is identified by a policy identifier field 309 and is specific to a particular network protocol that is identified in a protocol identifier field 311. The security policy specifies filters for some or all of ports and/or services defined by the protocol (collectively referred to as protocol "elements"). Each relevant port 313 and service 315 within a security policy is represented by an element identifier field 303, a field containing the filter settings 305, and a log indicator field 307. For example, a security policy for a TCP/IP network would include the PPTP (point-to-point tunneling protocol), RIP (routing information protocol), DHCP (dynamic host configuration protocol), ARP (address resolution protocol), Ident (identification protocol), ICMP (internet control message protocol) and VPN (virtual private networking) ports, and the NetBIOS (network basic input/output system) service. The default settings for a "high" security policy on a TCP/IP network would disallow incoming network traffic through the PPTP and ICMP ports, allow incoming network traffic through the RIP, DHCP, ARP and VPN ports, and disallow access through NetBIOS to shared resources on the computer and disallow the computer from using the shared resources of other computer on the network. Additionally, incoming network traffic that attempted to access the computer using PPTP and NetBIOS would be logged. In addition to globally allowing or disallowing network traffic through a port for a particular protocol, finer granularity filters may be achieved by specifying one or more source or destination addresses in the filter settings 305. The resulting security policy is based on a combination of ports and network addresses, such as "allow ICMP only to or from the specified addresses" or "disallow PPTP to or from the specified addresses."

A zone section 321 of the policy file data structure 300 contains an entry for each defined address zone. A zone entry includes an identifier field 323, a field 325 for the address parameters that define the zone, and an identifier field 237 for the security policy assigned to the zone. As described above, a default zone may be defined by addresses that are not within any other zone. In this case, the address parameters field 325 for the default zone entry would be empty. Thus, if an Internet zone is defined and the high security policy described previously for a TCP/IP network is assigned to the Internet zone, the invention would shield the computer from attacks using the high security policy when the computer was attached to the Internet.

Figure 4A:
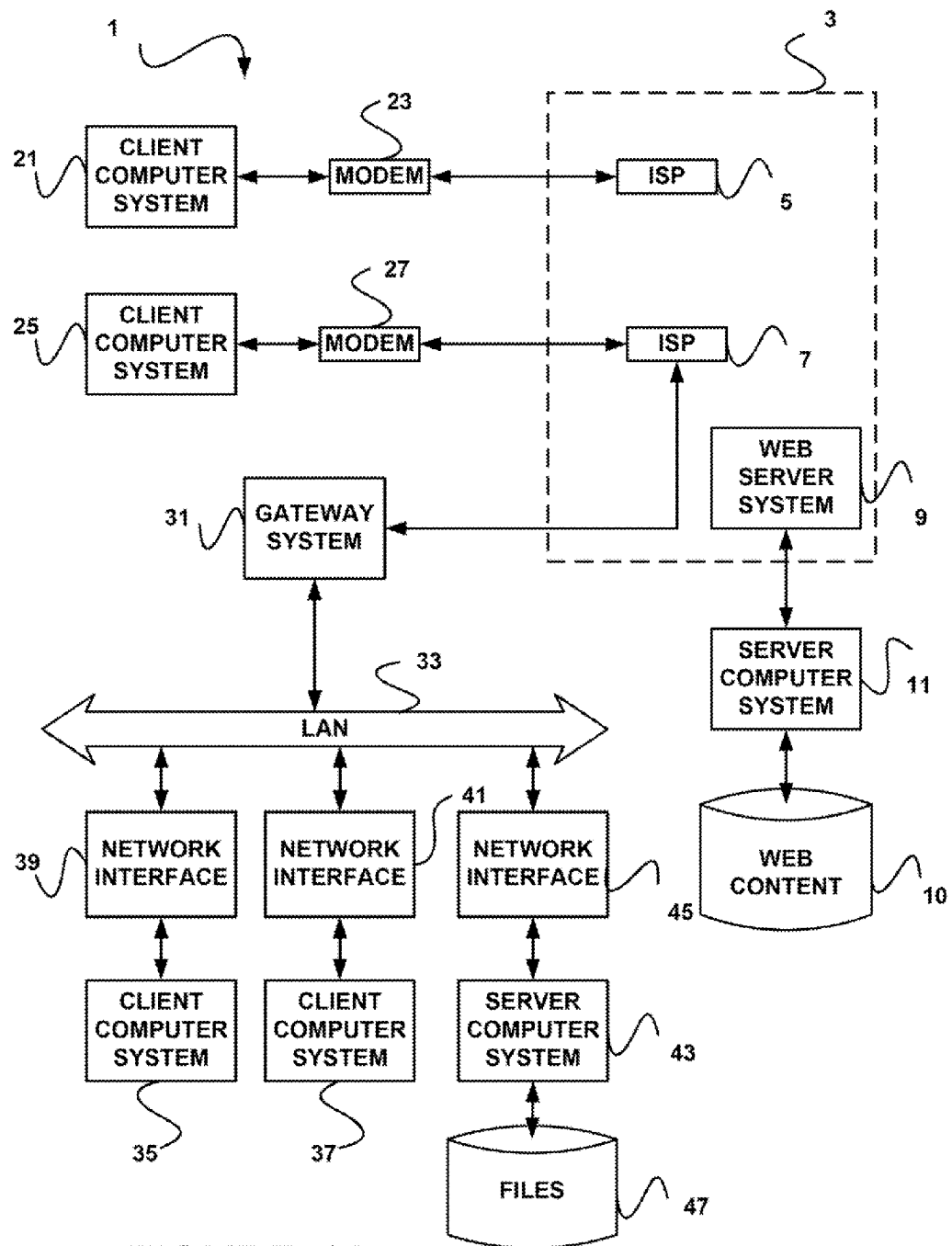
FIG. 4A is a diagram of one embodiment of an operating environment suitable for practicing the present invention.
Figure 4B:
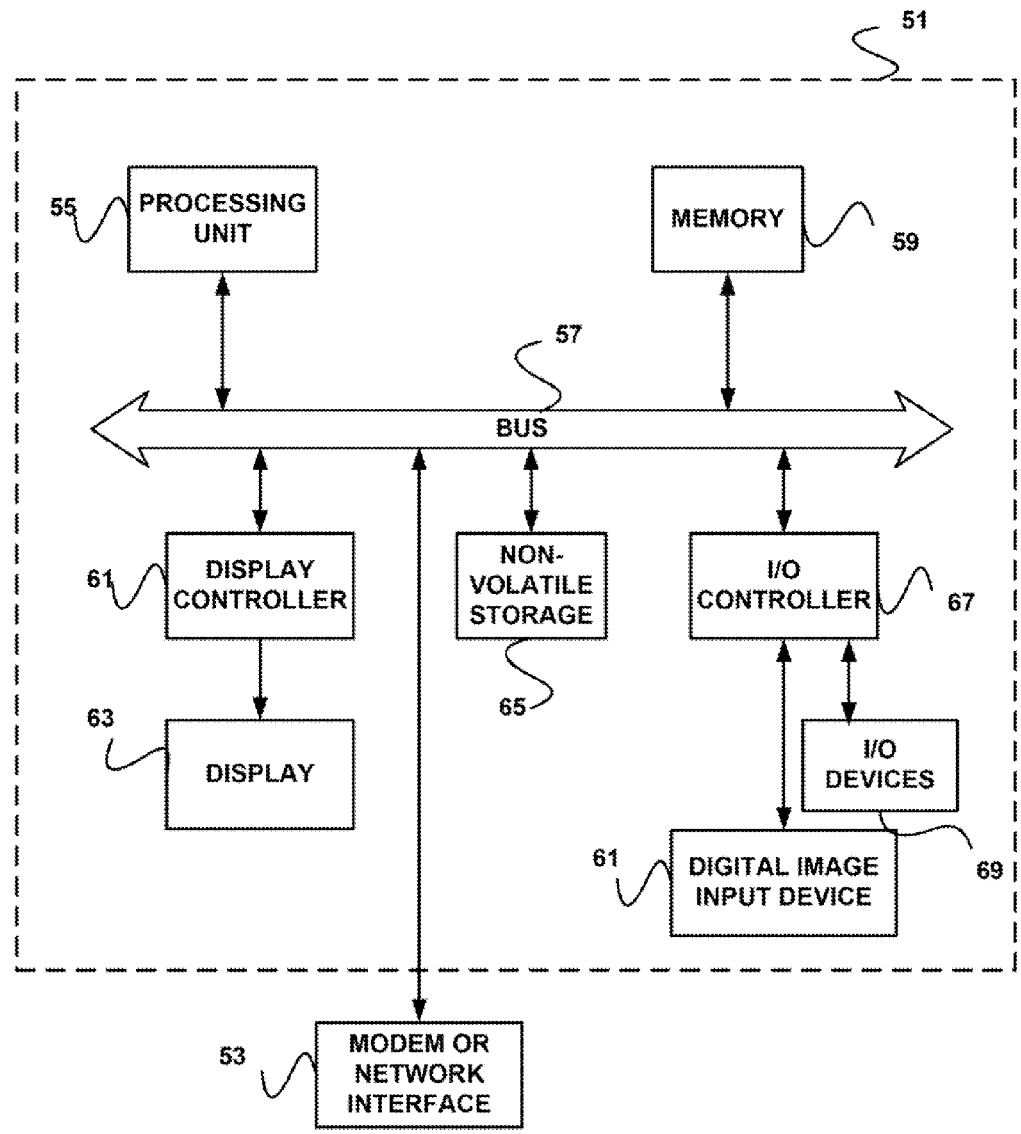
FIG. 4B is a diagram of one embodiment of a computer system suitable for use in the operating environment of FIG. 4A.

The following description of FIGS. 4A-B is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7, through either physical or wireless interfaces. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. the client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the compute system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage x65 and to display controller x61 and to the input/output (I/O) controller x67. The display controller x61 controls in the conventional manner a display on a display device x63 which can be a cathode ray tube (CRT) or liquid crystal display. The input/output devices x69 can include a keyboard, disk drives, printers, a scanner, and other input and output devices, including a mouse or other pointing device. The display controller x61 and the I/O controller x67 can be implemented with conventional well known technology. A digital image input device x61 can be a digital camera which is coupled to an I/O controller x67 in order to allow images from the digital camera to be input into the computer system 51. The non-volatile storage x65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage x65 and causes the processor 55 to execute the various acts required by the operating system to input and output data and to store data in memory, including storing files on the non-volatile storage 65.

Automatic configuration of a computer firewall based on a address for a network adapter has been described. Although specific embodiments have been illustrated and described herein, it be appreciated by those of ordinary skill in the art that any arrangement which is calculated to achieve the same purpose may be substituted for the specific embodiments shown. This application is intended to cover any adaptations or variations of the present invention.

For example, those of ordinary skill in the art will appreciate that while the invention as been described as configuring firewall software executing on the processing unit of the computer the firewall is protecting, the present invention is equally applicable to firewall software executing on a processing unit for a hardware firewall. Furthermore, one of ordinary skill in the art will immediately recognize that "network adapter" is a generic term for all network interfaces that connect a computer to any type of network environment. Therefore, it is manifestly intended that this invention be limited only by the following claims and equivalents thereof.

What is claimed:

1. A policy file data structure stored in a memory of a computer that includes a processor, and a network adapter, the policy file data structure which is read by the processor, comprises:

a policy identifier field containing data representing an identifier for a security policy that is associated with the network adapter and a network address zone;

a protocol identifier field containing data representing an identifier for a protocol associated with the security policy identified in the policy identifier field;

a protocol element entry containing data representing a protocol element for the protocol identified by the protocol identifier field, wherein the protocol element entry is associated with port filtering, and the security policy specifies filters for services related to the protocol associated with the security policy, wherein the protocol element entry comprises:

an element identifier field containing data representing an identifier for the protocol element field;

a setting field containing data representing a filter setting for the protocol element identified by the element identifier field; and a log indicator field containing data representing a decision on logging data utilizing the protocol element identified by the element identifier field; and a zone identifier field associated with restricting communications for the network address zone, wherein connecting to a network causes the computer to read the data structure and configure itself according to the security policy that is associated with a particular network address of the network address zone.

2. The policy file data structure of claim 1, wherein the filter setting is chosen from at least one of allow, disallow, source address and destination address.

3. The policy file data structure of claim 1 further comprising:
- an address parameters field containing data representing a set of network addresses that defines the zone identified by the zone identifier field; and
- an assigned policy identifier containing data representing the identifier for the security zone assigned to the zone identified by the zone identifier field.

4. The policy file data structure of claim 3, wherein the address parameters field contains data representing at least one address within the zone.

5. The policy file data structure of claim 3, wherein the address parameters field contains data representing at least one address outside the zone.

6. A method for managing network communications for a computer that includes a processor, a memory, and a network adapter, comprising:
- reading a policy identifier field containing data representing an identifier for a security policy that is associated with the network adapter and a network address zone;
- reading a protocol identifier field containing data representing an identifier for a protocol associated with the security policy identified in the policy identifier field;
- associating a protocol element entry containing data representing a protocol element for the protocol identified by the protocol identifier field with the network adapter, wherein the protocol element entry is associated with port filtering, and the security policy specifies filters for services related to the protocol associated with the security policy, wherein the protocol element entry comprises:
  - an element identifier field containing data representing an identifier for the protocol element field;
  - a setting field containing data representing a filter setting for the protocol element identified by the element identifier field; and
  - a log indicator field containing data representing a decision on logging data utilizing the protocol element identified by the element identifier field; and
- reading a zone identifier field associated with restricting communications for the network address zone, wherein connecting to a network causes the computer to configure itself according to the security policy that is associated with a particular network address of the network address zone.

7. The method of claim 6, wherein the protocol element entry comprises:
- a setting field containing data representing a filter setting for the protocol element identified by the element identifier field.

8. The method of claim 7, wherein the filter setting is chosen from at least one of allow, disallow, source address and destination address.

9. The method of claim 6 further comprising:
- reading an address parameters field containing data representing a set of network addresses that defines the zone identified by the zone identifier field; and
- reading an assigned policy identifier containing data representing the identifier for the security zone assigned to the zone identified by the zone identifier field.

10. A system comprising:
- a processor, a memory, and a network adapter, the system being executed to:
- read a policy identifier field containing data representing an identifier for a security policy that is associated with the network adapter and a network address zone;
- read a protocol identifier field containing data representing an identifier for a protocol associated with the security policy identified in the policy identifier field;
- associate a protocol element entry containing data representing a protocol element for the protocol identified by the protocol identifier field with the network adapter, wherein the protocol element entry is associated with port filtering, and the security policy specifies filters for services related to the protocol associated with the security policy, wherein the protocol element entry comprises:
  - an element identifier field containing data representing an identifier for the protocol element field;
  - a setting field containing data representing a filter setting for the protocol element identified by the element identifier field; and
  - a log indicator field containing data representing a decision on logging data utilizing the protocol element identified by the element identifier field; and
- read a zone identifier field associated with restricting communications for the network address zone, wherein connecting to a network causes the computer to read and configure itself according to the security policy that is associated with a particular network address of the network address zone.

11. The system of claim 10, wherein the protocol element entry comprises:
- a setting field containing data representing a filter setting for the protocol element identified by the element identifier field.

12. The system of claim 11, wherein the filter setting is chosen from at least one of allow, disallow, source address and destination address.

* * * * *

UNITED STATES PATENT AND TRADEMARK OFFICE
CERTIFICATE OF CORRECTION

PATENT NO.        : 8,468,256 B1                                     Page 1 of 1
APPLICATION NO.   : 11/772759
DATED             : June 18, 2013
INVENTOR(S)       : Mark J. McArdle et al.

It is certified that error appears in the above-identified patent and that said Letters Patent is hereby corrected as shown below:

On the title page, in Item (56), in column 2, under "Other Publications", line 1, delete "Seurity" and insert -- Security --, therefor.

Signed and Sealed this
Thirty-first Day of December, 2013

Margaret A. Focarino
*Commissioner for Patents of the United States Patent and Trademark Office*